United States Patent
Kuo et al.

(10) Patent No.: US 10,296,278 B2
(45) Date of Patent: May 21, 2019

(54) POWER DISTRIBUTION APPARATUS HAVING CAPABILITY FOR COLOR MANAGEMENT

(71) Applicant: CYBER POWER SYSTEMS, INC., Taipei (TW)

(72) Inventors: Yu-Chen Kuo, Taipei (TW); Yung-Hao Peng, Taipei (TW); Shih-Chien Tang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 164 days.

(21) Appl. No.: 15/240,058

(22) Filed: Aug. 18, 2016

(65) Prior Publication Data
US 2017/0102907 A1    Apr. 13, 2017

(30) Foreign Application Priority Data

Oct. 8, 2015 (TW) .............................. 104133167 A

(51) Int. Cl.
| | |
|---|---|
| G06F 3/14 | (2006.01) |
| G06F 1/26 | (2006.01) |
| G09G 3/20 | (2006.01) |
| H02J 3/00 | (2006.01) |
| G06F 3/02 | (2006.01) |
| H01R 25/00 | (2006.01) |

(52) U.S. Cl.
CPC .............. *G06F 3/1423* (2013.01); *G06F 1/26* (2013.01); *G06F 3/02* (2013.01); *G09G 3/2003* (2013.01); *G09G 3/2096* (2013.01); *H02J 3/005* (2013.01); *G06F 2200/261* (2013.01); *G09G 2320/0626* (2013.01); *G09G 2320/08* (2013.01); *G09G 2354/00* (2013.01); *G09G 2360/144* (2013.01); *H01R 25/003* (2013.01)

(58) Field of Classification Search
None
See application file for complete search history.

(56) References Cited

U.S. PATENT DOCUMENTS

| | | | |
|---|---|---|---|
| 8,639,459 B1 | 1/2014 | Morales et al. | |
| 9,727,515 B2* | 8/2017 | Whitney | G06F 13/4068 |
| 9,823,721 B1* | 11/2017 | McGee | G06F 1/30 |
| 2011/0205693 A1* | 8/2011 | Jansma | G06F 1/266 |
| | | | 361/601 |
| 2015/0190094 A1* | 7/2015 | Lee | A61B 5/6898 |
| | | | 600/479 |

\* cited by examiner

*Primary Examiner* — Nurun N Flora
(74) *Attorney, Agent, or Firm* — Bacon & Thomas, PLLC

(57) ABSTRACT

A PDA (power distribution apparatus) having capability for color management has at least one PDU (power distribution unit). The PDU has a plurality of outlets and a display; wherein the screen color of the display can display different colors according to the management item, thereby enhancing visualization of the management of the PDA.

4 Claims, 14 Drawing Sheets

POWER DISTRIBUTION APPARATUS HAVING CAPABILITY FOR COLOR MANAGEMENT

BACKGROUND OF THE INVENTION

1. Field of the Invention

The invention relates to a PDA (power distribution apparatus) having capability for color management, and more particularly to a PDU (power distribution unit) that can be provided with a display, in which the screen color of the display can display different colors according to the management item, thereby enhancing visualization of the management of the PDA.

2. Description of Related Art

U.S. Pat. No. 8,639,459 discloses that a PDU power monitoring module can be used to control and store an address of each PDU, and that each rack system may have only one rack PDU, or more than two rack PDUs. The prior-art can monitor each PDU by way of a network, but the wiring arrangement of the rack room is complicated. In the rack room, so that the maintenance staff cannot easily identify the electric power source of each PDU, the load type of each PDU and the network of the load. If the rack room needs to execute an expansion, a repair or a check, the maintenance staff cannot easily find out a correct location of the PDU and a correct location of the load. Thus, the prior-art can be improved by the facilitating management of the rack room through enhanced visualization. Moreover, if the rack room uses the shell color of the PDU to achieve the visualize management, then the color of the PDU is fixed, so that the PDU color cannot adjust to adapt to the apparatus function, or the PDU color cannot change to adapt to the wiring arrangement.

SUMMARY OF THE INVENTION

It is therefore a first object of the invention to provide a PDA (power distribution apparatus) having capability for color management, the PDA including a first PDU (power distribution unit) and a second PDU, in which the first PDU can electrically connect to an external first power source, and the second PDU can electrically connect to an external second power source; wherein the first PDU can be provided with a first display, the screen color of the first display can be set as a first color, the second PDU can be provided with a second display, the screen color of the second display can be set as a second color, thereby identifying and managing the electric power source of the PDA.

It is therefore a second object of the invention to provide a PDA having capability for color management, the PDA including a first PDU and a second PDU, in which the first PDU can be provided with a first communication interface, and the second PDU can be provided with a second communication interface; wherein the first communication interface and the second communication interface can be a Master-Slave communication frame. When the first communication interface is communicatively connected to the second communication interface, the first communication interface and the second communication interface can form a Daisy-Chain, the first PDU can serve as a Master PDU, the screen color of the first PDU can be displayed as a first color, the second PDU can serve as a Slave PDU, the screen color of the second PDU can be displayed as a second color, thereby identifying the Master-Slave relationship of the first PDU and the second PDU.

It is therefore third object of the invention to provide a PDA having capability for color management, the PDA including a first PDU and a second PDU, in which the first PDU can supply power to a first load, the second PDU can supply power to a second load; wherein the first PDU can be provided with a first display, the screen color of the first display can be set as a first color, the second PDU can be provided with a second display, and the screen color of the second display can be set as a second color, thereby identifying and managing the loads of the PDA.

It is therefore fourth object of the invention to provide a PDA having capability for color management, the PDA including a PDU, in which the PDU can be provided with an AST (Auto Transfer Switch), and the PDU can electrically connect an external first power source and an external second power source; wherein the PDU can be provided with a display such that, when the AST is switched to connect the first power source to supply power, the screen color of the display can be displayed as a first color; and when the AST is switched to connect the second power source to supply power, the screen color of the display can be displayed as a second color, thereby identifying and managing the source of electrical power of the PDA.

A first advantage of the invention is that since the PDA has the capability for intuitive color management, when the PDA has a plurality of PDUs (power distribution units), a user can identify the electric power source of the PDUs by the screen color of the PDUs. Because the color display of the PDUs have a larger area, the PDUs can particularly be suitable for a server room or a place having complicated cabling.

A second advantage of the invention is that the PDUs can use an ALS (Ambient Light Sensor) to automatically detect environment to adjust the brightness of the screen color, or the PDUs can manually adjust the brightness of the screen color.

A third advantage of the invention is that, for a PDA having a plurality of PDUs, the PDA has the capability for Master-Slave color management. Because the color display of the PDUs will be in accordance with a Master-Slave communication frame of the PDA, a user can use the screen color of the PDUs to identify the Master-Slave relationship of the PDUs.

A fourth advantage of the invention is that, for a the PDA having a plurality of PDUs, the PDA has the capability for load color management. Because the color display of the PDUs will be in accordance with the load type or the network domain belonging to the load, a user can use the screen color of the PDUs to identify the load type or the network domain belonging to the load.

A fifth advantage of the invention is that, for a PDA having a PDU, the PDU has an AST (Auto Transfer Switch), a user can use the screen color of the PDU to identify the electrical power source of the AST.

The above and other objects, features and advantages of the invention will become apparent from the following detailed description taken with the accompanying drawings.

DETAILED DESCRIPTION OF THE INVENTION

Figure 1:
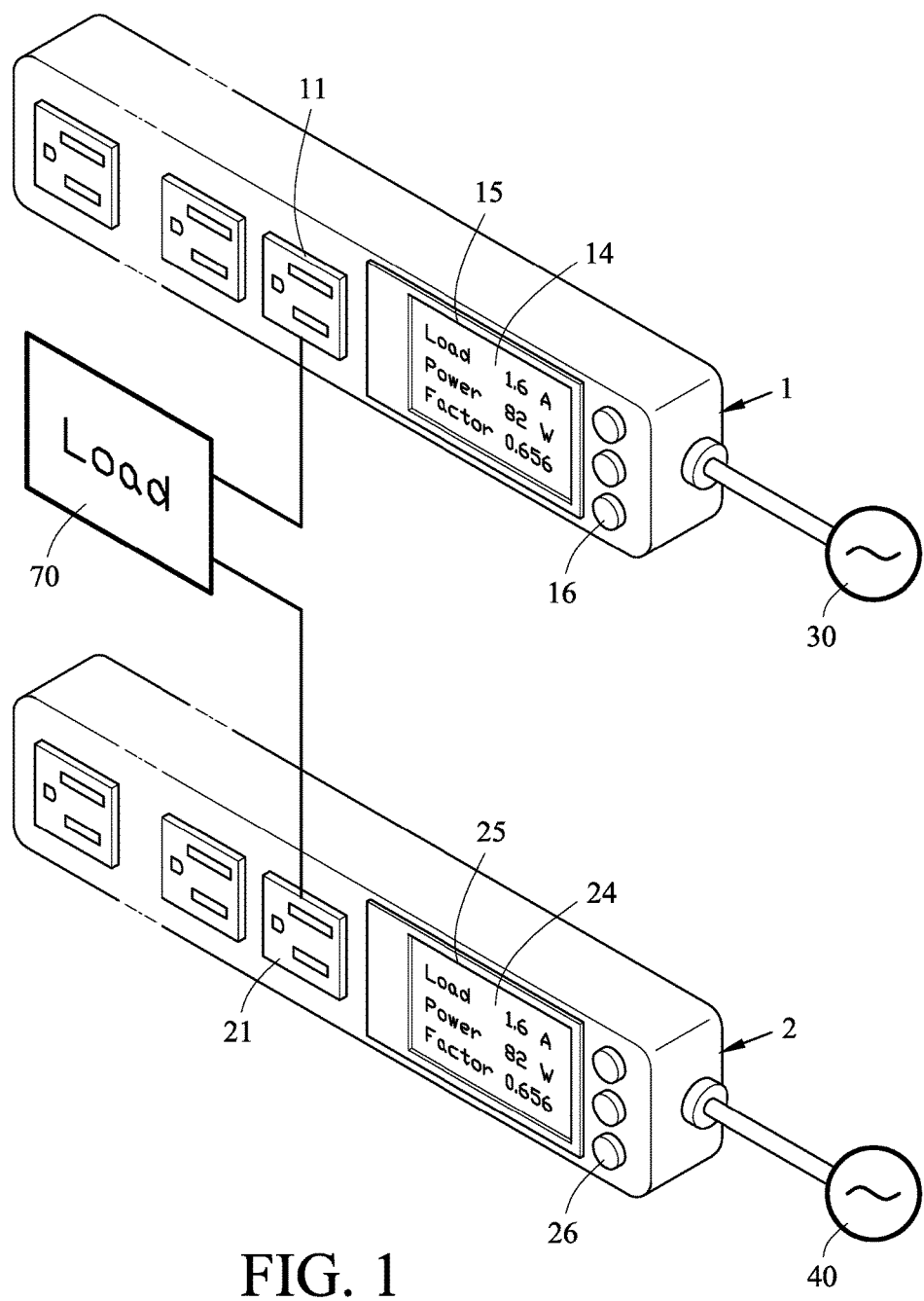
FIG. 1 is a perspective view showing a first embodiment of the invention.
Figure 2:
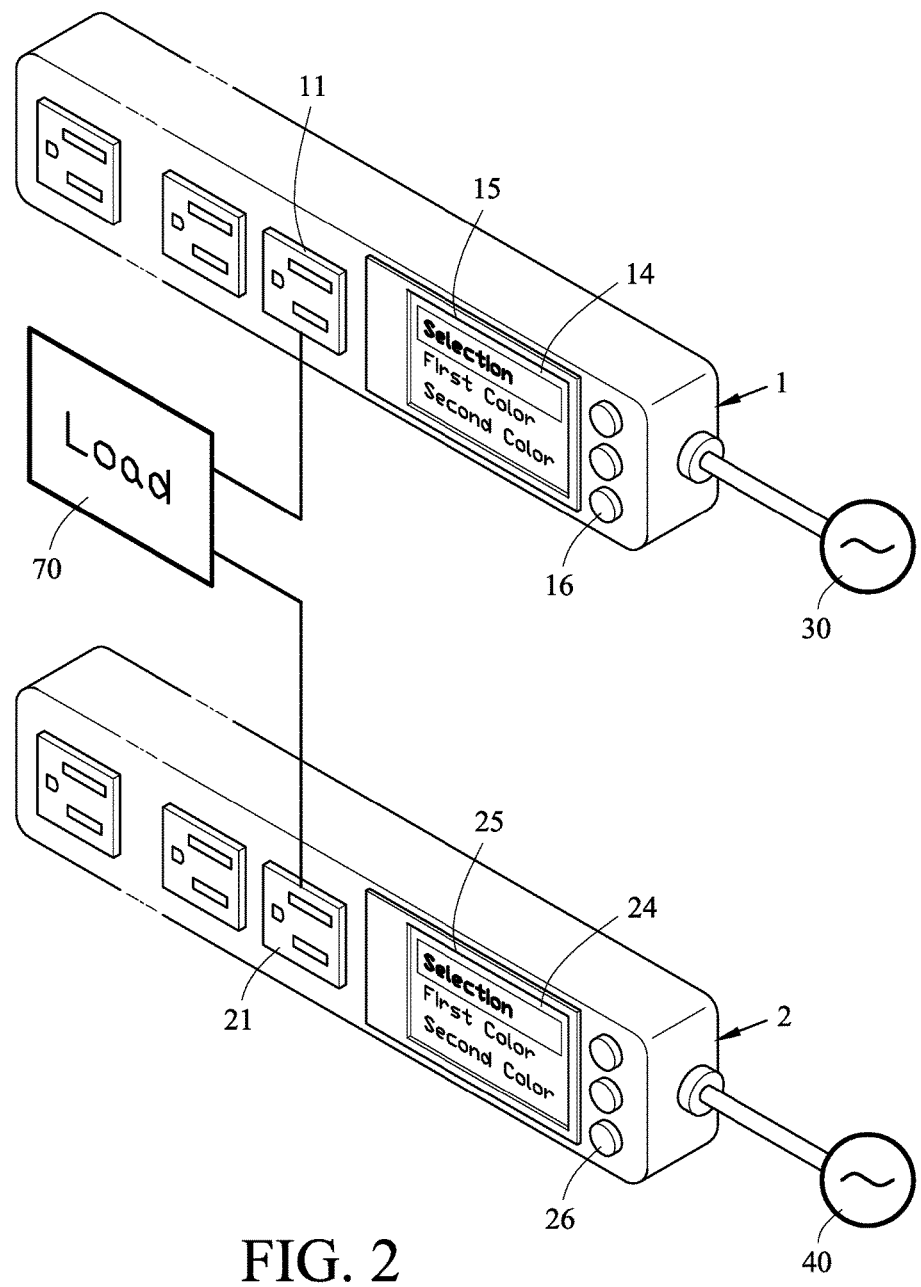
FIG. 2 is a first and second setting menu diagram illustrating the first embodiment of the invention.
Figure 3:
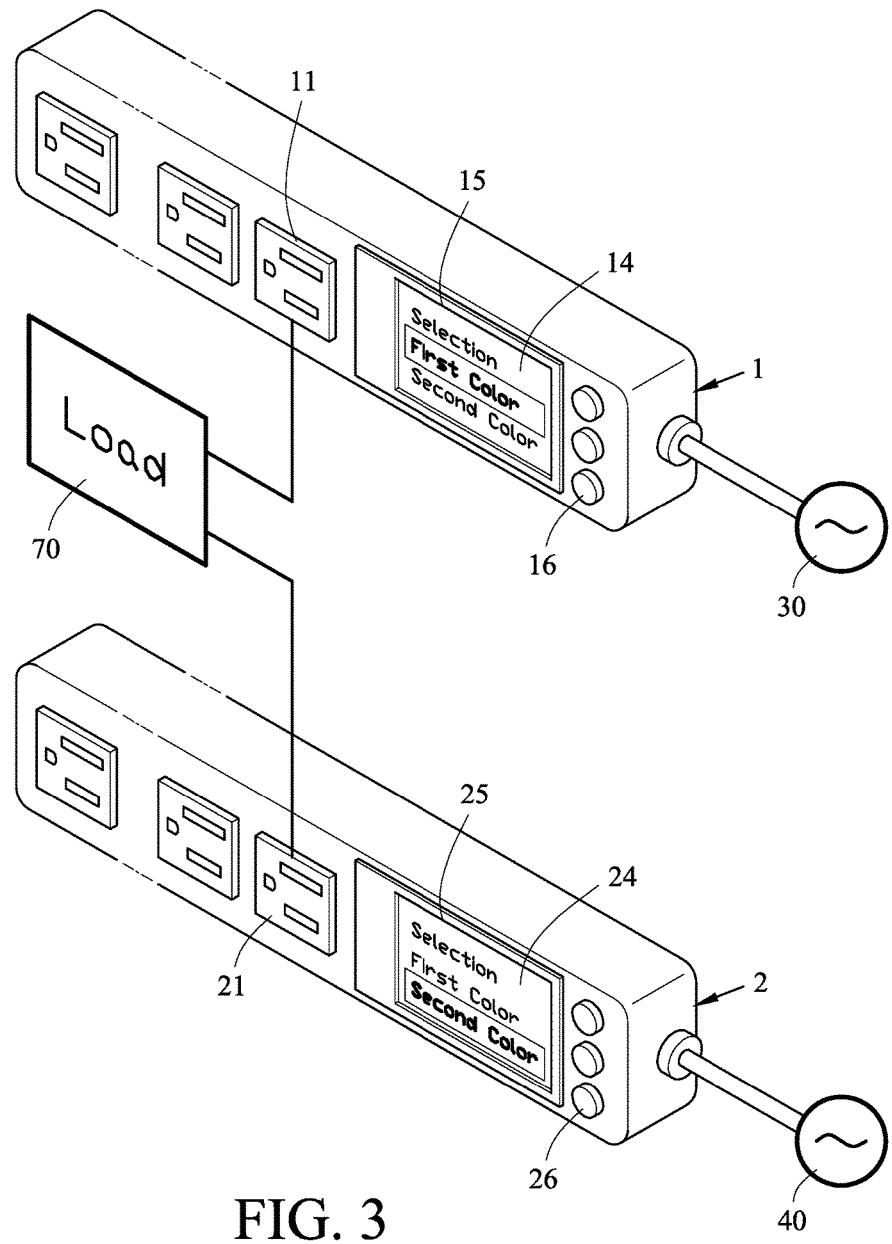
FIG. 3 is the color option of the first and second setting menu diagram illustrating the first embodiment of the invention.
Figure 4:
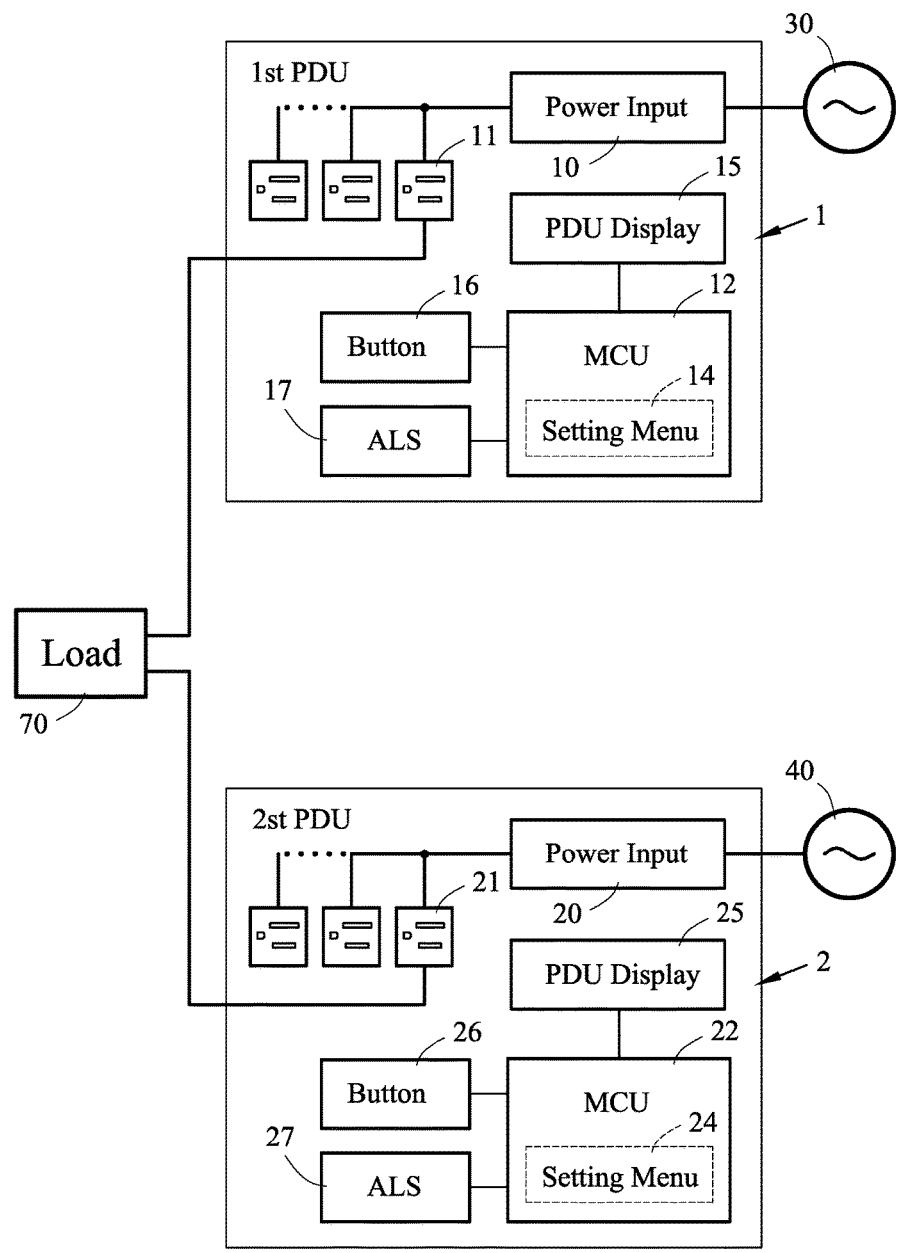
FIG. 4 is a functional block diagram illustrating the first embodiment of the invention.

Referring to FIGS. 1 to 4, a PDA (power distribution apparatus) in accordance with a first embodiment of the invention comprises a first PDU (power distribution unit) 1, a first setting menu 14, a first display 15, a second PDU 2, a second setting menu 24, a second display 25; the first PDU 1 has a first power input terminal 10, the first power input terminal 10 can be electrically connected to a plurality of first outlets 11 and an external first power source 30; the second PDU 2 has a second power input terminal 20, the second power input terminal 20 can be electrically connected to a plurality of second outlets 21 and an external second power source 40; the first display 15 is disposed on the first PDU 1, an internal first processor 12 of the first PDU 1 can drive the screen color of the first display 15; the first setting menu 14 can be provided by the first processor 12, the first setting menu 14 can be displayed on the first display 15; the second display 25 is disposed on the second PDU 2, an internal second processor 22 of the second PDU 2 can drive the screen color of the second display 25; the second setting menu 24 can be provided by the second processor 22, the second setting menu 24 can be displayed on the second display 25; wherein the first PDU 1 has a first button assembly 16 to use to select the color option of the first setting menu 14 (e.g., a first color option and a second color option), therefore the screen color (e.g., backlight color or background color) of the first display 15 will be a first color (for example but not limit to blue). Moreover, the second PDU 2 has a second button assembly 26 to use to select the color option of the second setting menu 24 (e.g., a first color option and a second color option), therefore the screen color (e.g., backlight color or background color) of the second display 25 will be a second color (for example but not limit to red). Thus, the PDA has the capability for intuitive color management. Because the color display has larger area, the invention can particularly be suitable for a server room or a place having complicated cabling.

As an example of the manner in which the supply of power by the PDA to a load is executed, at least one of the first outlets 11 can supply power to a first load 70 (by way of example and not limitation, to a server), and at least one of the second outlets 21 can supply power to the first load 70, the first display 15 can display a first power information of the first PDU 1, the second display 25 can display a second power information of the second PDU 2, the first power information and the second power information can select from voltage, electric current, power consumption, or power factor, as shown in FIG. 1. When the power source 30 is normally supplying power, the first load 70 can be supplied power by the power source 30, also the power source 30 and the second power source 40 can together supply power the first load 70. When the power supply of the power source 30 is abnormal, the second power source 40 can supply enough electric power to the first load 70.

As an example of the manner in which the first display 15 and the second display 25 are executed, the first display 15 and the second display 25 can be selected from an LED (light emitting diode) display or OLED (organic light emitting diode) display. The first display 15 can use an ALS (Ambient Light Sensor) 17 to automatically detect environment to adjust the brightness, or the first display 15 can use the first button assembly 16 to manually adjust the brightness. Moreover, the second display 25 can use an ALS 27 to automatically detect environment to adjust the brightness, or the second display 25 can use the second button assembly 26 to manually adjust the brightness.

Figure 5:
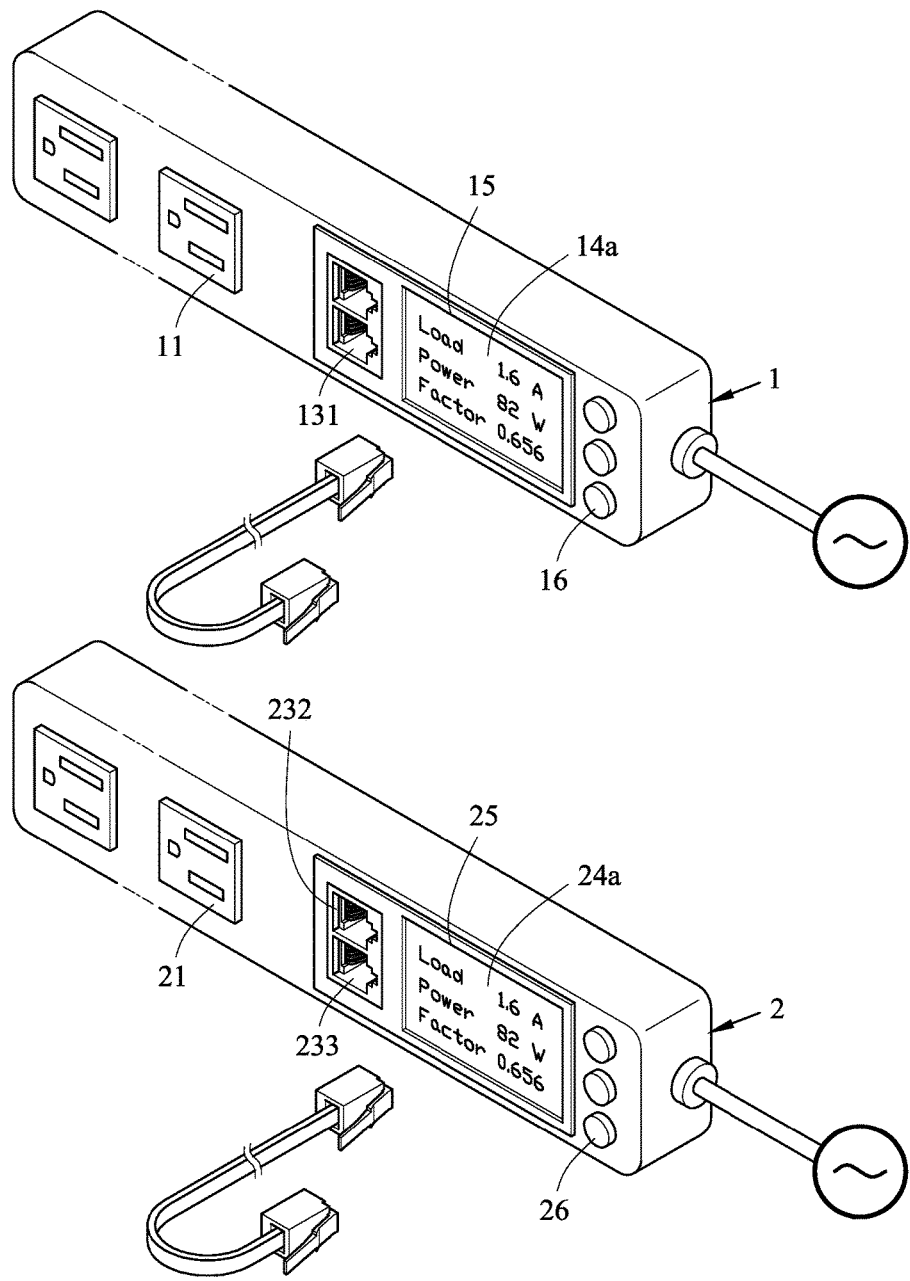
FIG. 5 is a perspective view showing a second embodiment of the invention.
Figure 6:
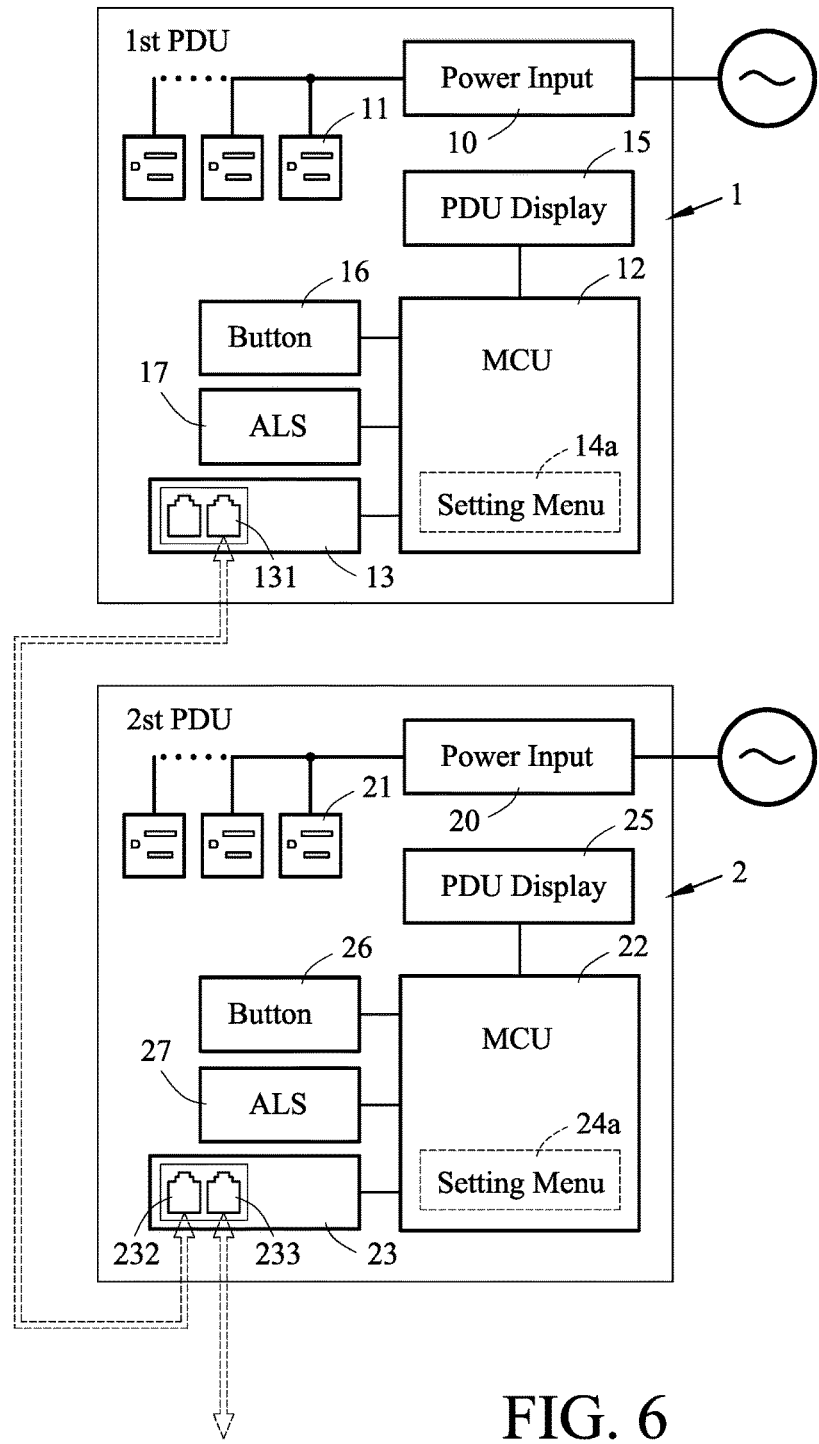
FIG. 6 is a functional block diagram illustrating the second embodiment of the invention.
Figure 7:
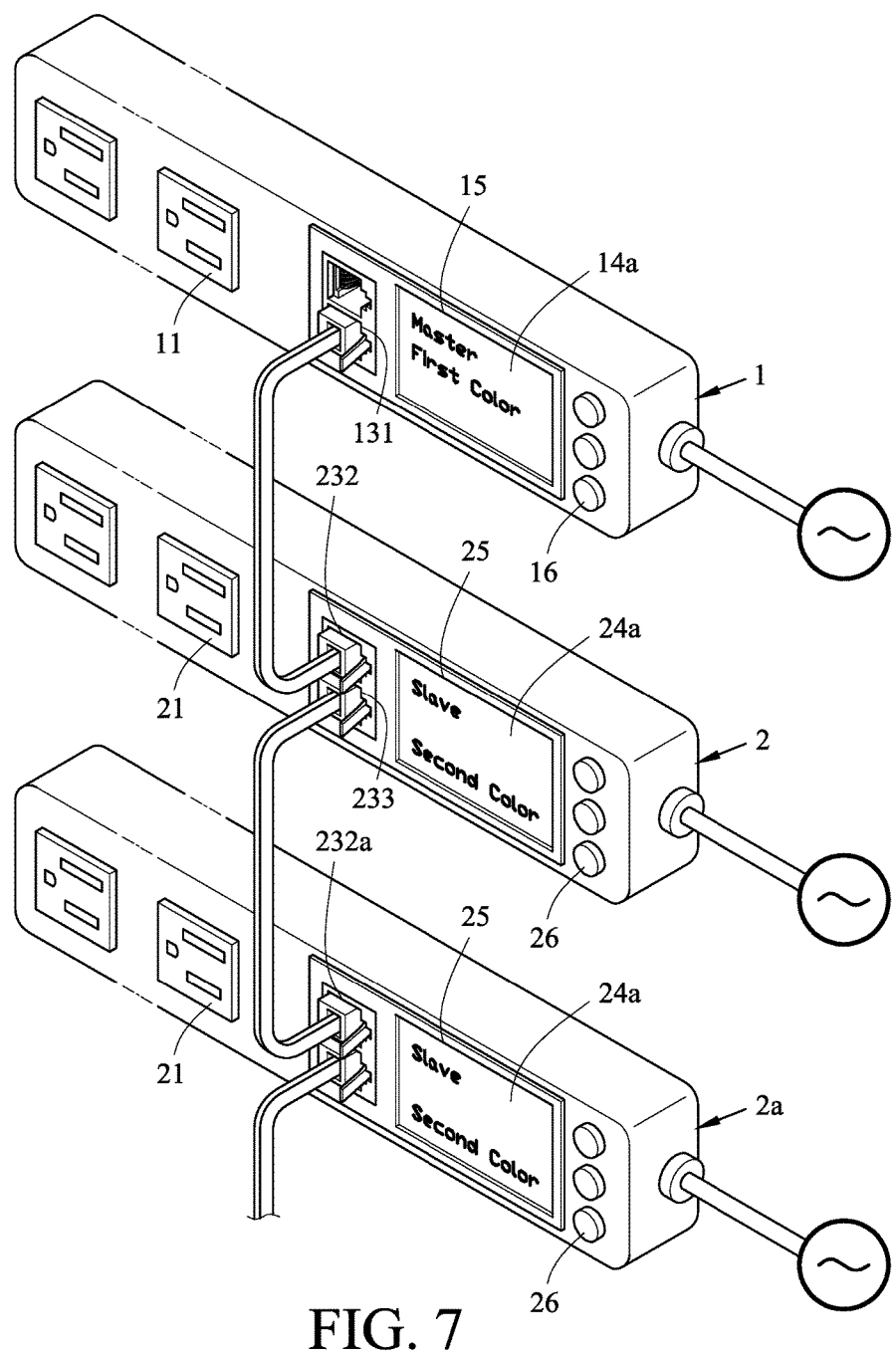
FIG. 7 is an expanding manner diagram illustrating the second embodiment of the invention.

Referring to FIGS. 5 to 7, in a second embodiment of the invention, the first PDU 1 further comprises a first communication interface 13, the first communication interface 13 has a first connector 131; the second PDU 2 further comprises a second communication interface 23, the second communication interface 23 has a second connector 231; wherein the first communication interface 13 and the second communication interface 23 can be a Master-Slave communication frame (for example but not limit to RS485). When the first connector 131 is communicatively connected to the second connector 231, the first communication interface 13 and the second communication interface 23 can form a Daisy-Chain, the first PDU 1 can serve as a Master PDU, the first processor 12 can drive the screen color of the first display 15 to display as a first color, and the second PDU 2 can serve as a Slave PDU, the second processor 22 can drive the screen color of the second display 25 to display as a second color, a user can use the screen color of the first PDU 1 and the second PDU 2 to identify the Master-Slave relationship of the first PDU 1 and the second PDU 2. Thus, the PDA of the invention has the capability for Master-Slave color management.

Referring to FIGS. 5 to 7, in the second embodiment of the invention, the first PDU 1 further comprises a first communication interface 13, the first communication interface 13 has a first connector 131; the second PDU 2 further comprises a second communication interface 23, the second communication interface 23 has a second connector 231; wherein the first communication interface 13 and the second communication interface 23 can be a Master-Slave communication frame (for example but not limit to RS485). When the first connector 131 is communicatively connected to the second connector 231, the first communication interface 13 and the second communication interface 23 can form a Daisy-Chain, the first PDU 1 can serve as a Master PDU, the first processor 12 can the screen color of the first 15 to display as a first color, and the second PDU 2 can serve as a Slave PDU, the second processor 22 can the screen color of the second 25 to display as a second color, a user can use the screen color of the first PDU 1 and the second PDU 2 to identify the Master-Slave relationship of the first PDU 1 and the second PDU 2. Thus, the PDA of the invention has the capability for Master-Slave color management.

In an example of a first setting manner of Master-Slave color, the first processor 12 and the second processor 22 can preset a setting value of Master-Slave color; wherein the setting value of Master-Slave color can define the screen color of the Master PDU as the first color, and the setting value of Master-Slave color can define the screen color of the Slave PDU as the second color.

In an example of a second setting manner of Master-Slave color, the first processor 12 can provide a third setting menu 14a, the third setting menu 14a can be displayed on the first display 15, the first PDU 1 has the first button assembly 16 to set up the Master-Slave color setting value of the third setting menu 14a; the second processor 22 can provide a fourth setting menu 24a, the fourth setting menu 24a can be displayed on the second display 25, the second PDU 2 has the second button assembly 26 to set up the Master-Slave color setting value of the fourth setting menu 24a; wherein the setting value of Master-Slave color can define the screen color of the Master PDU as the first color, and the setting value of Master-Slave color can define the screen color of the Slave PDU as the second color.

In an example of a connection manner of plural Slave PDUs, the second communication interface 23 further has a third connector 233 to use to communicatively connect another second PDU 2a, the third connector 233 can be communicatively connected to a fourth connector 234 of the second PDU 2a, therefore the Daisy-Chain can communicatively connect with a plurality of Slave PDUs, the screen color of the first PDU 1 and the second PDU 2, 2a is showed in FIG. 7.

Figure 8:
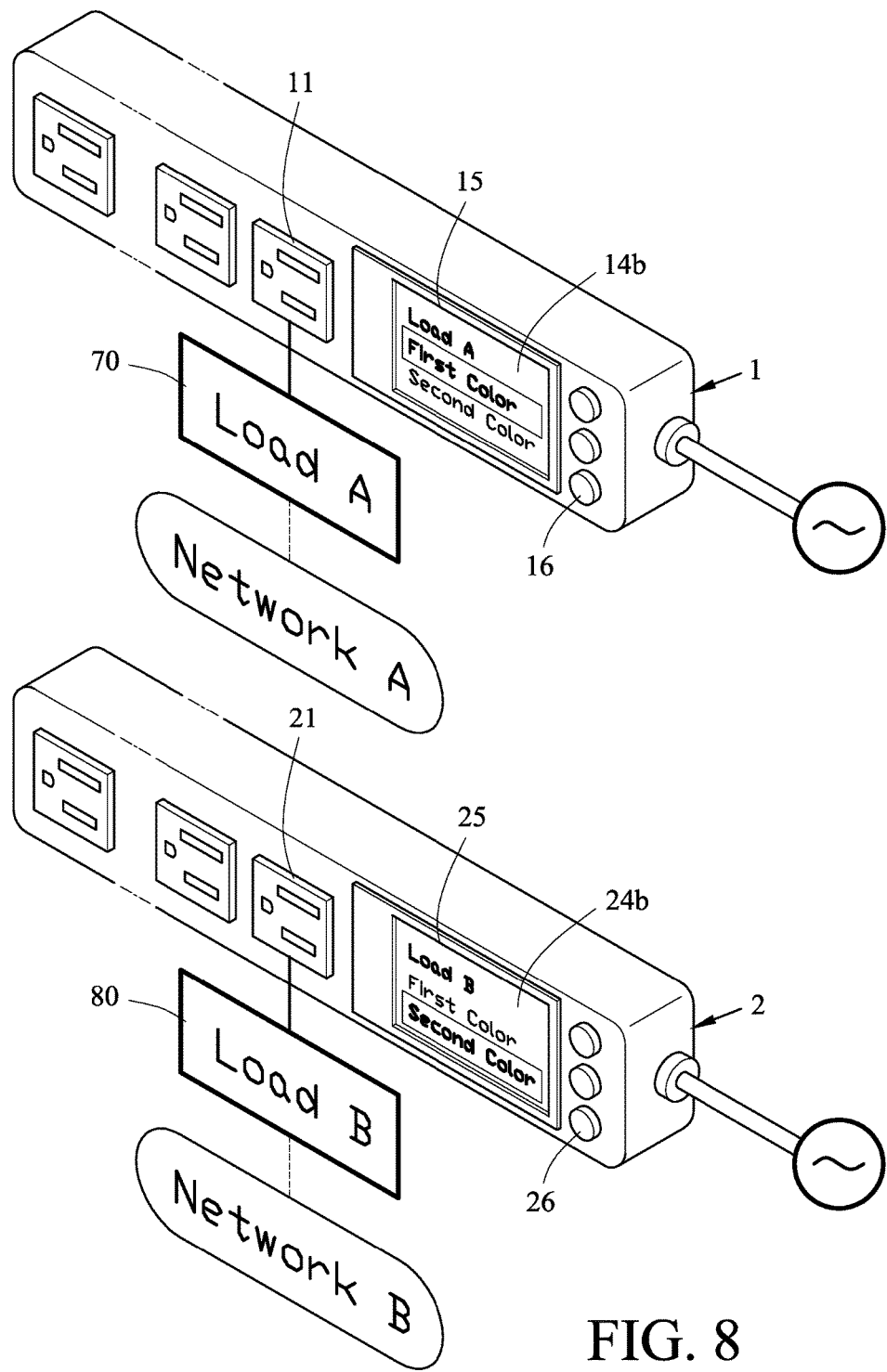
FIG. 8 is a perspective view showing a third embodiment of the invention.
Figure 9:
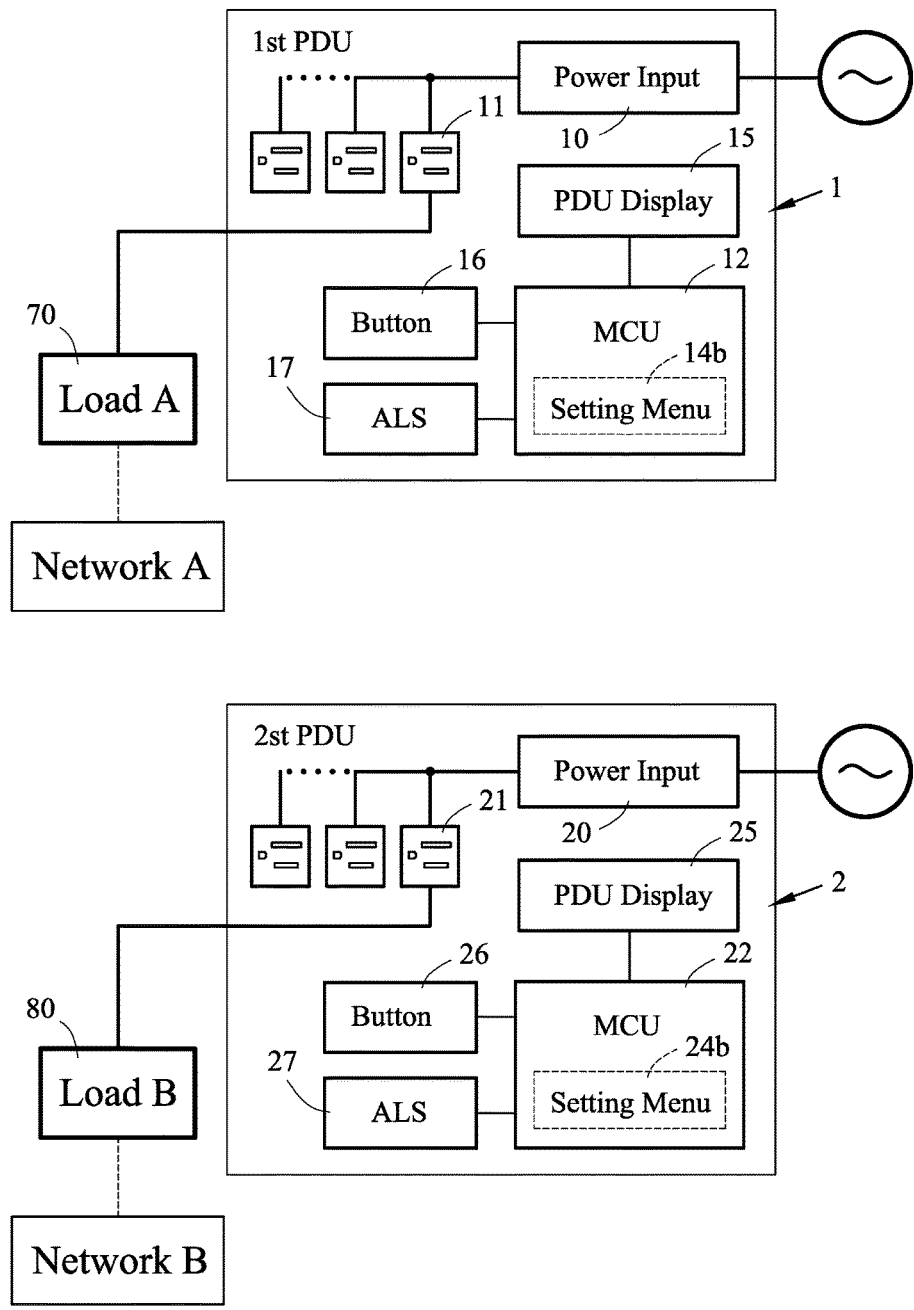
FIG. 9 is a functional block diagram illustrating the third embodiment of the invention.
Figure 10:
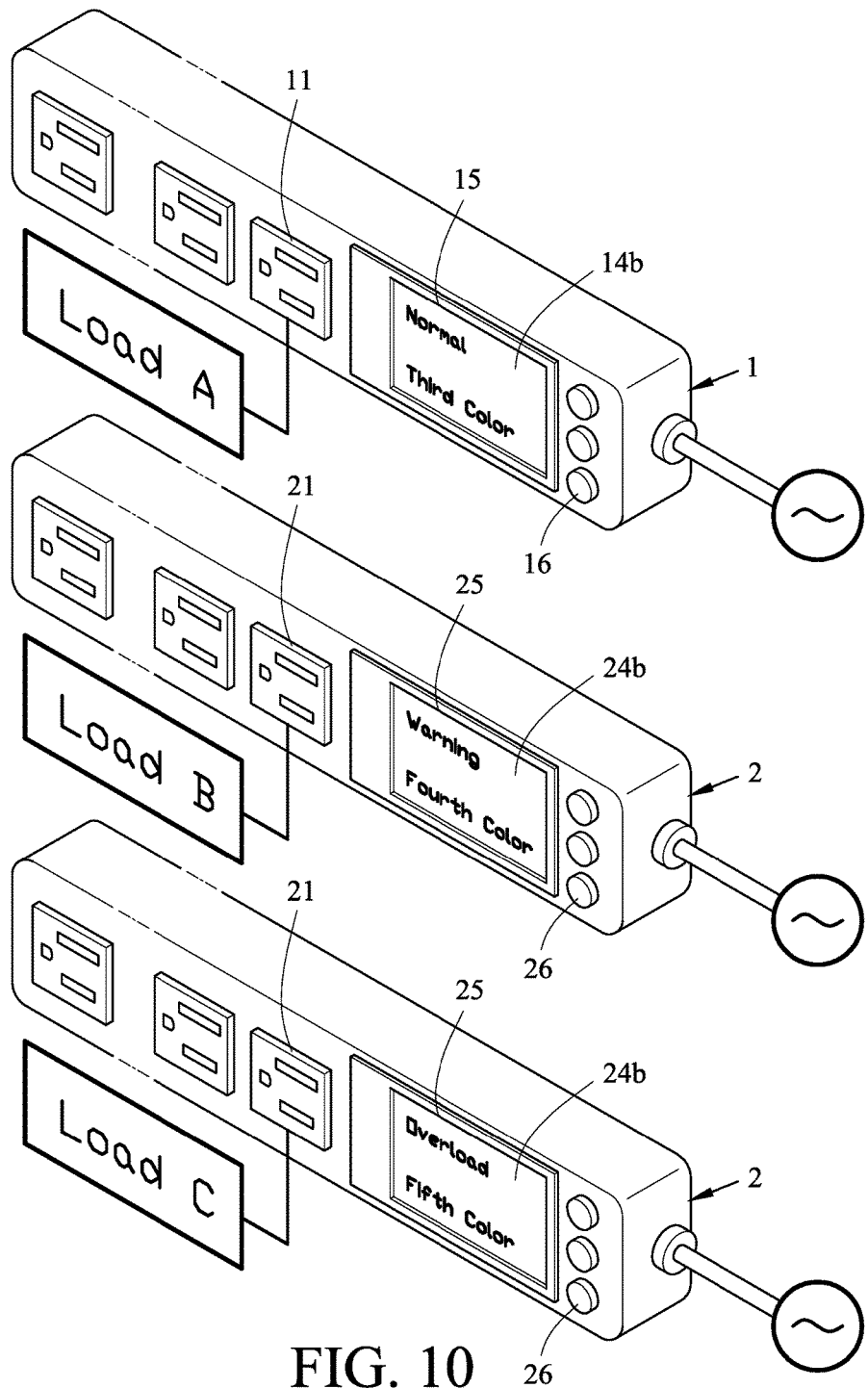
FIG. 10 is a displaying load status diagram illustrating the third embodiment of the invention.

Referring to FIGS. 8 to 10, in a third embodiment of the invention, at least one of the first outlets 11 can supply power to a first load 70, the first processor 12 can drive the screen color of the first display 15 to display as a first color, and at least one of the second outlets 21 can supply power to a second load 80, the second processor 22 can drive the screen color of the second display 25 to display as a second color, therefore the PDA of the invention has the capability for load color management.

In an example of a first setting manner of load color, the first processor 12 can provide a fifth setting menu 14b, the fifth setting menu 14b can be displayed on the first display 15, the first PDU 1 has the first button assembly 16 to set up the load color setting value of the fifth setting menu 14b; the second processor 22 can provide a sixth setting menu 24b, the sixth setting menu 24b can be displayed on the second display 25, the second PDU 2 has the second button assembly 26 to set up the load color setting value of the sixth setting menu 24b; wherein the setting value of load color can define the screen color according to the load type or the network domain belonging to the load, a user can use the screen color of the first PDU 1 and the second PDU 2 to identify the load type or the network domain belonging to the load, as shown in FIG. 8.

In an example of a second setting manner of load color, the first processor 12 and the second processor 22 can preset a setting value of load status; wherein the setting value of load status can define the screen color of normal status as a third color, the setting value of load status can define the screen color of warning status as a fourth color, and the setting value of load status can define the screen color of overload status as a fifth color. For example, when the load of the first PDU 1 is in the normal status, the screen color of the first PDU 1 can be the third color; when the load of the second PDU 2 is in the warning status, the screen color of the second PDU 2 can be the fourth color; when the load of another second PDU 2a is in the overload status, the screen color of the second PDU 2a can be the fifth color, as shown in FIG. 9.

Referring to FIGS. 11 to 14, in a fourth embodiment of the invention, the PDA comprises a PDU 9, a first power input terminal 90, a second power input terminal 90a and display 95; the PDU 9 can be provided with an AST (Auto Transfer Switch) 99, the AST 99 can electrically connect a plurality of outlets 91, the first power input terminal 90 can electrically connect with the AST 99 and an external first power source 30, the second power input terminal 90a can electrically connect with the AST 99 and an external second power source 40, the display 95 is disposed on the PDU 9, an internal processor 92 of the PDU 9 can drive the screen color of the display 95; wherein the processor 92 can provide a seventh setting menu 94, the seventh setting menu 94 can be displayed on the display 95. When the AST 99 is switched to connect the first power source 30, the first power source 30 will supply power to the PDU 9, the processor 92 can drive the screen color of the display 95 to display as a first color. When the AST 99 is switched to connect the second power source 40, the second power source 40 will supply power to the PDU 9, the processor 92 can drive the screen color of the display 95 to display as a second color.

Figure 11:
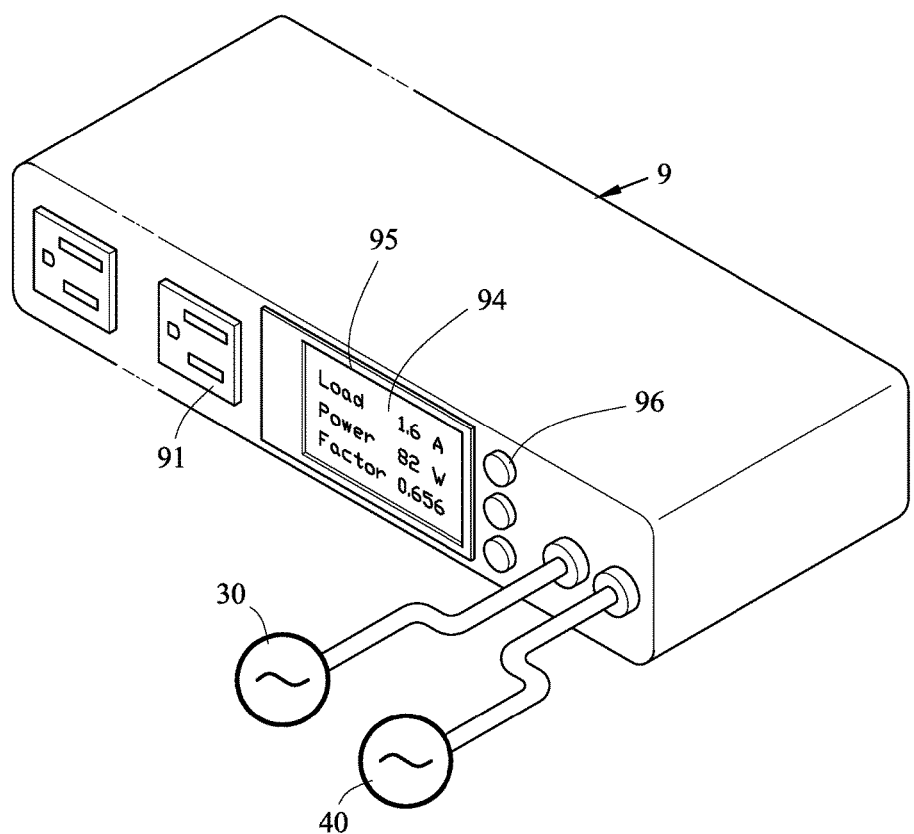
FIG. 11 is a perspective view showing a fourth embodiment of the invention.
Figure 12:
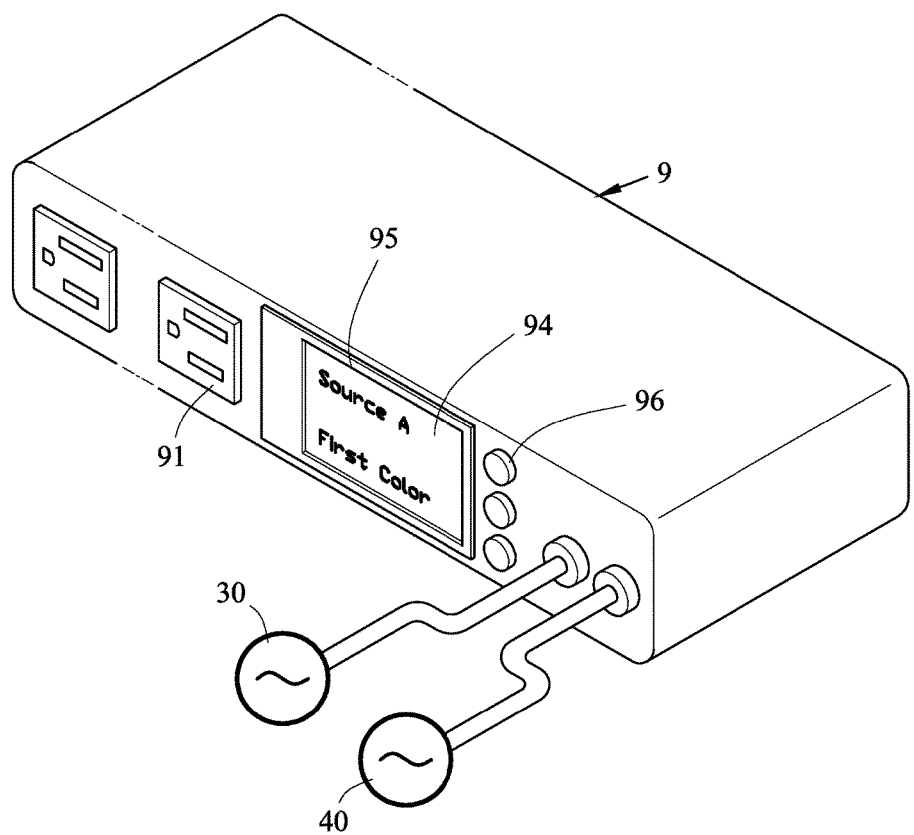
FIG. 12 is a first power source supplying power diagram illustrating the fourth embodiment of the invention.
Figure 13:
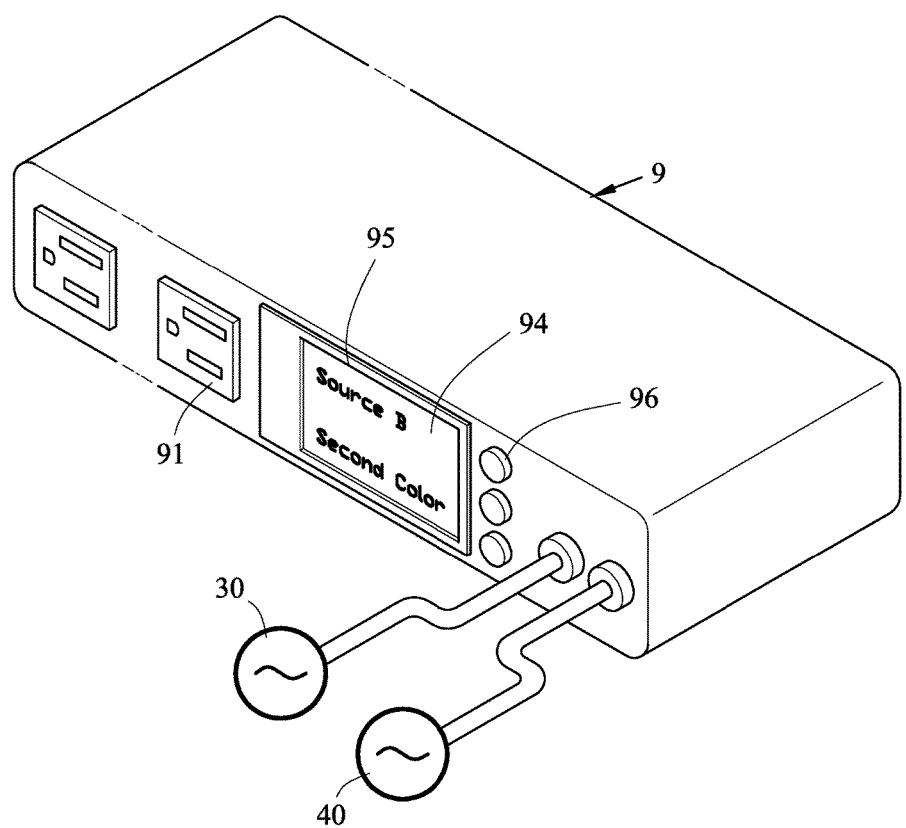
FIG. 13 is a second power source supplying power diagram illustrating the fourth embodiment of the invention.
Figure 14:
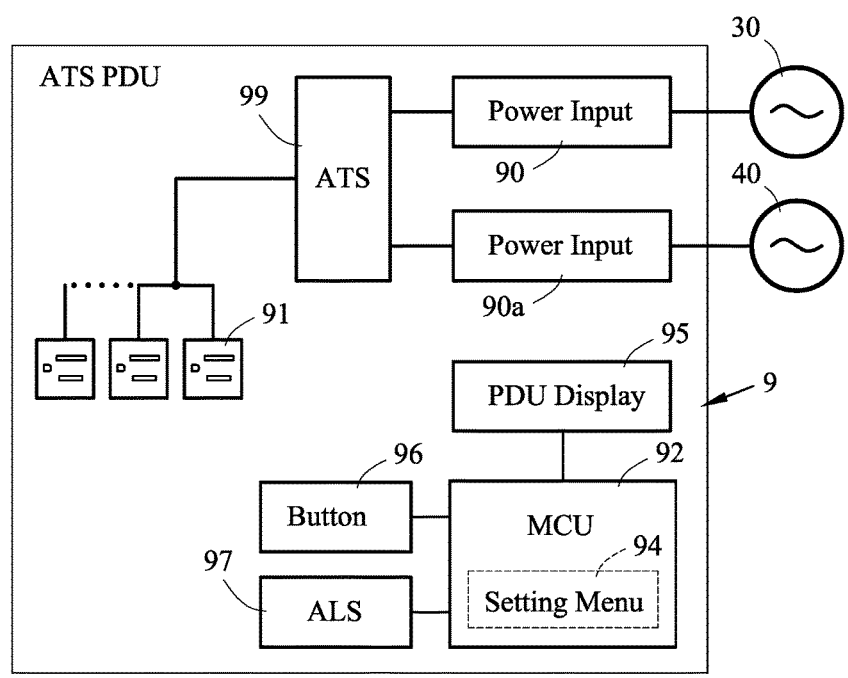
FIG. 14 is a functional block diagram illustrating the fourth embodiment of the invention.

By way of example, the display 95 can display power information, and the power information can be selected from voltage, electric current, power consumption, or power factor, as shown in FIG. 11. The display 95 can select from LED display or OLED display. The display 95 can use an ALS 97 to automatically detect environment to adjust the brightness, or the display 95 can use the button assembly 96 to manually adjust the brightness.

What is claimed is:

1. A PDA (power distribution apparatus) having capability for color management, the PDA comprising:
   a first PDU (power distribution unit) having a first power input terminal (10), the first power input terminal (10) adapted to be electrically connected to a plurality of first outlets (11) and a first power source (30);
   a second PDU having a second power input terminal (20), the second power input terminal (20) adapted to be electrically connected to a plurality of second outlets (21) and a second power source (40);
   a first display (15) disposed on the first PDU, an internal first processor (12) of the first PDU driving the screen color of the first display (15), wherein a first setting menu (14) is provided by the first processor (12), the first setting menu (14) being displayed on the first display (15);
   a second display (25) disposed on the second PDU, an internal second processor (22) of the second PDU driving the screen color of the second display (25), wherein a second setting menu (24) is provided by the second processor (22) and displayed on the second display (25);
   wherein the first PDU has a first button assembly (16) to use to select a color option of the first setting menu (14) in which the screen color of the first display (15) is a first color; and the second PDU has a second button assembly (26) to use to select a color option of the second setting menu (24) in which the screen color of the second display (25) is a second color, whereby the PDA has the capability for intuitive color management.

2. The PDA having capability for color management of claim 1, wherein when the power source (30) is a main power source, the first PDU uses the first color to identify as the main power source, and when the second power source (40) is a redundancy power source, the second PDU uses the second color to identify as the redundancy power source.

3. The PDA having capability for color management of claim 1, wherein at least one of the first outlets (11) supplies power to a first load (70), and at least one of the second outlets (21) supplies power to the first load (70), the first display (15) displays a first power information of the first PDU, the second display (25) displays a second power information of the second PDU, and the first power information and the second power information is selected from voltage, electric current, power consumption, or power factor.

4. The PDA having capability for color management of claim 1, wherein the first display (15) and the second display (25) are selected from an LED (light emitting diode) display or OLED (organic light emitting diode) display; the first display (15) uses an ALS (Ambient Light Sensor) to automatically detect environment to adjust the brightness, or the first display (15) uses the first button assembly (16) to manually adjust the brightness; the second display (25) uses an ALS to automatically detect environment to adjust the brightness, or the second display (25) uses the second button assembly (26) to manually adjust the brightness.

\* \* \* \* \*